(12) United States Patent
Bhatt

(10) Patent No.: US 8,299,135 B2
(45) Date of Patent: Oct. 30, 2012

(54) VAPOR PHASE ASSISTED POST-CONSUMER POLYMER PROCESSING APPARATUS AND METHOD

(75) Inventor: Girish Bhatt, Durham, NC (US)

(73) Assignee: Bepex International, LLC, Minneapolis, MN (US)

( * ) Notice: Subject to any disclaimer, the term of this patent is extended or adjusted under 35 U.S.C. 154(b) by 174 days.

(21) Appl. No.: 12/829,901

(22) Filed: Jul. 2, 2010

(65) Prior Publication Data

US 2011/0003903 A1    Jan. 6, 2011

Related U.S. Application Data

(60) Provisional application No. 61/222,547, filed on Jul. 2, 2009, provisional application No. 61/306,675, filed on Feb. 22, 2010.

(51) Int. Cl.
*C08J 11/04* (2006.01)

(52) U.S. Cl. .......... 521/48.5; 521/40; 521/40.5; 521/48; 528/272; 528/308.1; 528/308.2; 528/308.3; 528/480; 528/481; 528/483; 528/491; 528/495; 528/503

(58) Field of Classification Search ..................... 521/40, 521/40.5, 47, 48, 48.5; 528/271, 272, 308.1, 528/308.2, 308.3, 308.4, 480, 481, 483, 490, 528/491, 495, 502 R, 502 F, 503
See application file for complete search history.

(56) References Cited

U.S. PATENT DOCUMENTS

| | | | |
|---|---|---|---|
| 4,225,394 A | 9/1980 | Cox |
| 4,620,032 A | 10/1986 | Doerr |
| 5,554,657 A | 9/1996 | Brownscombe |
| 6,103,774 A | 8/2000 | Rule |
| 6,410,607 B1 | 6/2002 | Ekart |
| 6,580,005 B1 | 6/2003 | Yazaki |

OTHER PUBLICATIONS

International Search Report and Written Opinion, dated Aug. 31, 2010 for PCT Application No. PCT/US2010/040952, 6 pages.

*Primary Examiner* — Frances Tischler
(74) *Attorney, Agent, or Firm* — Fredrikson & Byron, P.A.

(57) ABSTRACT

Embodiments of the invention provide a process for processing post-consumer polymer. The polymer is contacted with a control medium having a carrier gas and a reactive vapor. Such a process is useful for processing post-consumer polymers with lower energy and reactants than with liquid reactants, and also promotes decontamination of the recycled polymer during the reaction.

24 Claims, 5 Drawing Sheets

VAPOR PHASE ASSISTED POST-CONSUMER POLYMER PROCESSING APPARATUS AND METHOD

RELATED APPLICATIONS

This application claims priority to U.S. Provisional Application Ser. No. 61/222,547, titled Vapor Phase Assisted Post-Consumer Polymer Processing Apparatus and Method, filed Jul. 2, 2009, and U.S. Provisional Application Ser. No. 61/306,675, titled Vapor Phase Assisted Post-Consumer Polymer Processing Apparatus and Method, filed Feb. 22, 2010, the contents of both of which are hereby incorporated by reference.

TECHNICAL FIELD

The invention relates to processing post-consumer polymers.

BACKGROUND OF THE INVENTION

Plastics can be recycled by a variety of methods, depending on the type of beginning polymer and the ultimate use of the recycled product. For example, post-consumer product polyester can be used in packaging applications, such as for beverages. Many of these recycling and recovery processes use various alternative processes to depolymerize the waste polyester to the monomer and then optionally filter and/or purify the monomer. The monomer can be then used as feedstock, for example, for polymerization with virgin raw materials. These processes all require additional steps or materials that lead to an increase in energy consumption.

The chemical treatment of poly(ethylene terephthalate) (PET), for instance, can be accomplished by hydrolysis, yielding terephthalic acid and ethylene glycol, or methanolysis, to provide di-methyl terephthalate (DMT) and ethylene glycol (EG), or glycolysis, which essentially reverses the polycondensation reaction to provide bis(hydroxyethylene) terephthalate (BHET) monomer.

Glycolysis of PET involves reacting waste PET with a glycol (such as EG) to produce the monomer bis-hydroxyethyl terephthalate (BHET) and other oligomers. This process has significant advantages over methanolysis or hydrolysis primarily because the BHET may be used as a raw material in either a DMT or terephthalic acid (TA) polyester production process without significant major modification of the production facility.

Generally, glycolysis reactions involve preparing the PET into the form of flakes, which are then soaked in a heated liquid having liquid EG at a concentration of twenty percent or more until the intrinsic viscosity is decreased to a desired extent. The liquid EG is used to break down the polymer but is not used for fine molecular weight control because it is difficult to precisely control. In yet another approach, liquid EG is injected into melted PET. The energy required to heat the liquid EG to the desired reaction temperature is significant, and the liquid EG must be recovered and purified, and then reheated to the desired reaction temperature.

Currently, processing of post-consumer PET includes a decontamination step whereby recycled PET flakes are melted under a vacuum to remove volatile contaminants and filtered to remove particulates. The filtered molten PET is then pelletized, crystallized, and solid state polymerized until a desired molecular weight range is achieved. The pellets are then reheated, dried, and reextruded into bottles, sheets, or films. The reheating and reextruding steps require additional energy and capital costs.

SUMMARY OF THE INVENTION

The present invention provides a method and corresponding apparatus and system for the processing of post-consumer polymers by exposure to reactants that are provided in the gas or vapor phase. In turn, this allows post-consumer polymer flakes to be decontaminated and fed to a solid state reactor (SSR) to recycle polymer for applications such as containers contacting edible goods (e.g., bottles and sheets) and textiles. In a preferred embodiment, polymer (e.g., poly(ethylene terephthalate)) can be depolymerized by initiating a glycolysis, methanolysis, or hydrolysis reaction in which the polymer is heated and then combined with a vapor phase reactant such as ethylene glycol, methanol, or water, respectively. The polymer itself may be either in the solid or the molten state. By treating the solid polymer with reactant vapors in an inert carrier gas such as carbon dioxide or nitrogen, lower amounts of the reactants are consumed, thereby eliminating the need to heat, recycle and purify the excess reactants. Further, the polymer may be directly processed into textiles or food packaging after the reaction because volatile contaminants are removed by diffusion into the gas stream, which purifies the polymer in the solid state reactor. Accordingly, embodiments of the invention have lower energy inputs and use less reactive raw material than processes using a liquid reactant. In addition, finer control of the process can be obtained with optimization of process parameters such as reactive vapor concentration, carrier gas temperature, polymer temperature, vapor flow rate, reaction time and polymer surface area.

In one embodiment, the process of the present invention comprises the steps of:

a) conveying polymer (e.g., PET) feed material to a reaction vessel, b) heating the polymer feed material to a temperature sufficient to initiate and sustain reaction in the solid state, c) contacting the heated polymer with a control medium comprising an inert carrier gas, such as Nitrogen, and a reactant, such as EG, in the vapor phase, d) performing a solid state reaction (SSR) between the polymer and control medium, to provide a product having desired properties (e.g., molecular weight "MW" and intrinsic viscosity "IV"), e) recovering the control medium, including unreacted reactant and volatile contaminants, which may then be decontaminated and recycled, and f) discharging the product.

Depending on the process variables a variety of operating regimes can be achieved, involving various levels of intrinsic viscosity (IV) including, for example:

1. Solid State Depolymerization (Reduced IV)
2. Solid State Neutral Polymerization (IV That Remains Constant)
3. Solid State Reduced Polymerization Rate (IV Increase Rate that is Low)
4. Solid State Polymerization (IV Increase Rate that is Un-Retarded)

The method and corresponding apparatus and system provide an optimal combination of features and attributes, including in terms of the amount of reactants consumed, the amount of energy (e.g., heat) required, and the ability to recycle and re-use reactants, as well as to purify excess reactants. In turn, the method permits the use of lower energy together with lesser raw materials, while also enhancing removal of volatile contaminants, thereby reducing both capital and operating costs.

The apparatus and system permit the user to better control the reaction process, as compared to a conventional method using liquid reactants, and in turn, to obtain an improved and optimal balance between various intermediate and final product parameters, including molecular weight and intrinsic viscosity. Finer control of the process can be obtained by optimization of process parameters such as vapor concentration, carrier gas temperature, vapor flow rate, reaction time, and polymer surface area.

The invention further provides a system adapted to convert post-consumer PET to a final product having any desired physical-chemical characteristics. In one embodiment, the system comprises:

a) a crystallizer/preheater for crystallizing and preheating post-consumer PET flakes, b) a SSR including a hopper to hold the PET flakes for a desired length of time and a mechanical discharge in order to remove post reaction product from the SSR, and c) a reactant vaporizer to vaporize a reactant and combine it with a carrier gas to be fed to the SSR.

The reactant vaporizer, as described herein, is considered novel in its own right, and can be used to vaporize a reactant such as EG, in order to then introduce it into the carrier gas flow, where it can be contacted with polymer within the SSR. Suitable reactant vaporizers can be provided in any suitable form, such as concentrated or unconcentrated liquids.

A system in accordance with the invention, in turn, comprises a reaction chamber comprising a gas/vapor circulation system, e.g., including inlet and outlet ports and corresponding delivery and recovery mechanisms, for delivering and recovering reactant in the vapor phase. In some embodiments, the reactant may be fully or partially condensed and/or separated from any contaminants and reintroduced to the reactant vaporizer.

The process permits hot PET to be treated in the solid state with ethylene glycol, methanol, and/or water vapors to retard the rate of polymerization and/or depolymerize the polymer. This increases the residence time of the PET in the SSR, which in turn allows post-consumer PET to be directly further processed after the SSR reaction. This treatment can be accomplished in a batch, semi-batch or a continuous process.

In a particularly preferred embodiment, the present invention permits the preparation of transparent polyester waste suitable for food grade applications. The present invention meets or exceeds the Food and Drug Administration (FDA) requirements for food contact with polyester and thus is useful in food contact applications, for example, beverage containers, food containers and polyester film wrap. Some embodiment of the invention provide recycled PET meeting FDA requirements for food contact applications with contaminant levels reduced below 0.22 ppm and an IV in the range of 0.78 to 0.82 dl/g. All percentages described herein are by weight unless indicated otherwise.

Ground and washed post-consumer poly(ethylene terephthalate) packaging (sometimes referred to herein as rPET) may be efficiently decontaminated and polymerized simultaneously for food contact packaging applications in accordance with some embodiments of the invention. In embodiments of the present invention, several of these energy, capital and labor intensive steps are eliminated. The hot decontaminated and polymerized flakes may be directly extruded into the bottles, sheets or films for food contact applications after the SSR because volatile contaminants in the polymer are removed by diffusion into the gas phase resulting in purifying the polymer in the solid state under atmospheric pressure instead of in the molten state. This results in lower energy, raw material, capital costs and a simplified process. Without intending to be bound by theory, it appears the presence of reactive vapors in the carrier gas enhances the diffusion of the volatile contaminant components. The presence of reactive vapors has also been shown to retard the rate of solid state polymerization, which allows for longer residence times and/or higher temperatures for efficient decontamination without excessive molecular weight (and corresponding IV) build-up, which would otherwise limit the application of the product and require that it be re-heated before processing for many food grade and textile applications.

DETAILED DESCRIPTION

Figure 1:
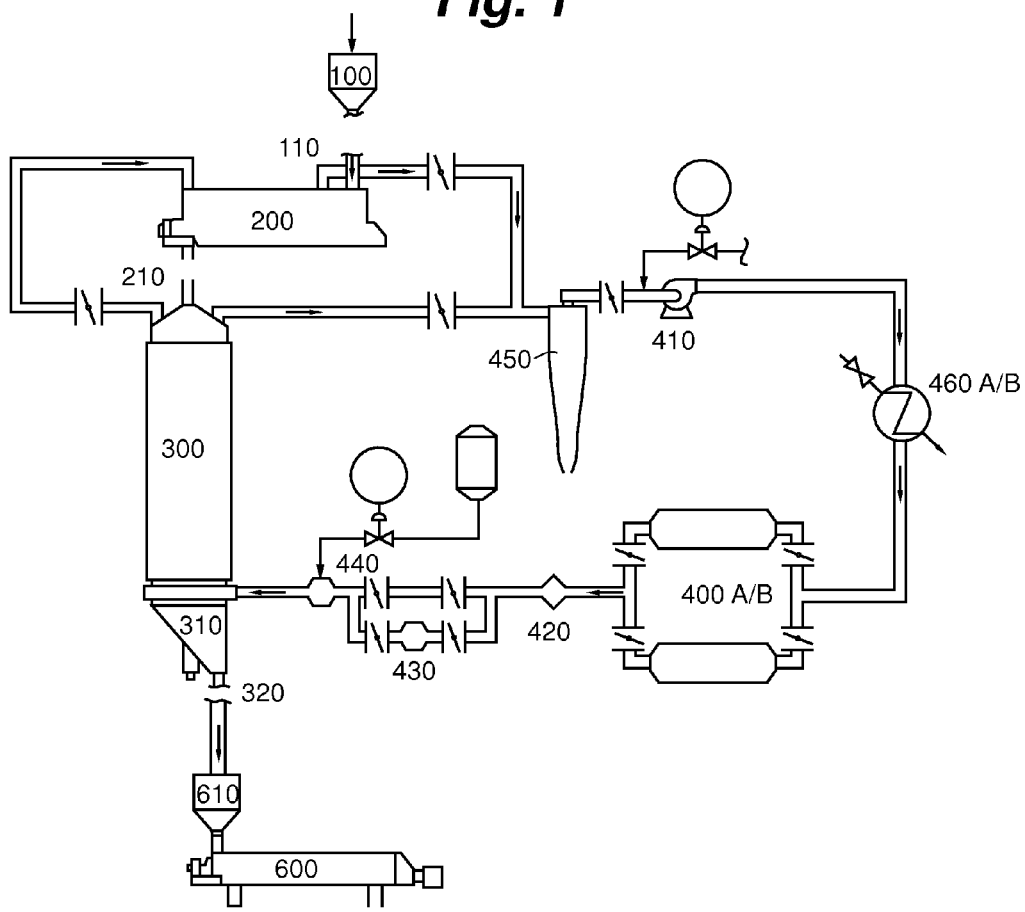
FIG. 1 provides a schematic view of an overall post-consumer polymer processing system in accordance with an embodiment of the invention.

For the purpose of promoting an understanding of the principles of the present invention, reference will now be made to the embodiments illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates. The process and apparatus of this invention will be described with reference to the Figures.

Conveying Feed Material

Figure 1A:
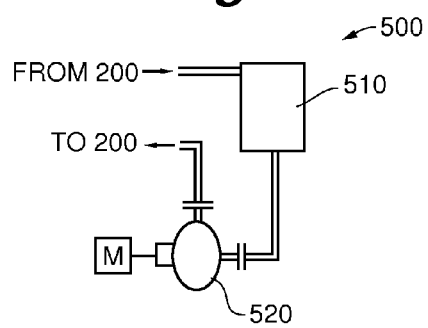
FIG. 1A provides a schematic view of a recirculating oil heater for the preheater shown in FIG. 1.

In some embodiments, polymer from a blending silo is conveyed via a bulk solid conveying method (e.g., compressed air). Any suitable polymer can be processed in accordance with embodiments of the invention. In some embodiments, the polymer is rPET. As shown in FIG. 1, the material can then be fed from a polymer feed hopper 100 by a valve 110 (e.g., a rotary valve) into a suitable preheater 200 (e.g., a TorusDisc Preheater connected to a hot oil system 500 shown in FIG. 1A). As shown in FIG. 1A, the system 500 can include a heater 510 and a pump 520 useful for circulating hot oil from the system 500 to the polymer preheater 200.

Preheating Feed Material

In certain embodiments, the material is heated to its reaction temperature in the preheater 200. In embodiments using the TorusDisc Preheater, heating is achieved by conduction from the hot multiple disc rotor. The rotor also provides agitation and conveyance for efficient heat transfer and discharge. In such embodiments a carrier gas, such as nitrogen or carbon dioxide, circulates within the system, and a portion of the carrier gas leaving a solid state reactor 300 sweeps the agitated bed surface and removes some dust, moisture and volatile organic chemicals released during preheating. The heated polymer can then be discharged through an overflow weir to the solid state reactor 300 through valve 210. The balance of the gas leaving the solid state reactor 300, along with the gas exiting the heater 200, can be passed through cyclone 450 where the entrained fines are collected. The gas can then be sent to the gas purification system 400 before being returned back to the inlet of the solid state reactor 300, as descried further below.

Control Medium Introduction

Embodiments of the invention include a control medium to react with, and decontaminate, the polymer in the solid state reactor. The control medium can include a carrier gas and a reactive vapor. The carrier gas can be any gas useful for carrying the reactive vapor, such as carbon dioxide or nitrogen. Any useful concentration of reactive vapor in the carrier gas can be used. In some embodiments, (e.g., when the carrier gas is nitrogen and the reactive vapor is EG), the concentration of the reactive vapor can be between about 10 and 3,000 ppm. In other embodiments, the concentration is between about 10 and about 1,000 ppm. In other embodiments, the concentration is about 500 ppm.

In some embodiments, the gas from the gas purification system 400 is heated to the reaction temperature in the gas heater 430. The stream of hot gas can pass through a reactive vapor incorporator 440 before entering the solid state reactor 300. In the incorporator 440, the reactive vapor can be metered in a controlled and repeatable fashion. One suitable embodiment comes in the form of an atomized spray. The spray in contact with heating elements vaporizes the liquid which is carried out of the unit by the flow of gas. Other methods known by those skilled in the art are suitable replacements for this specific example.

Figure 2:
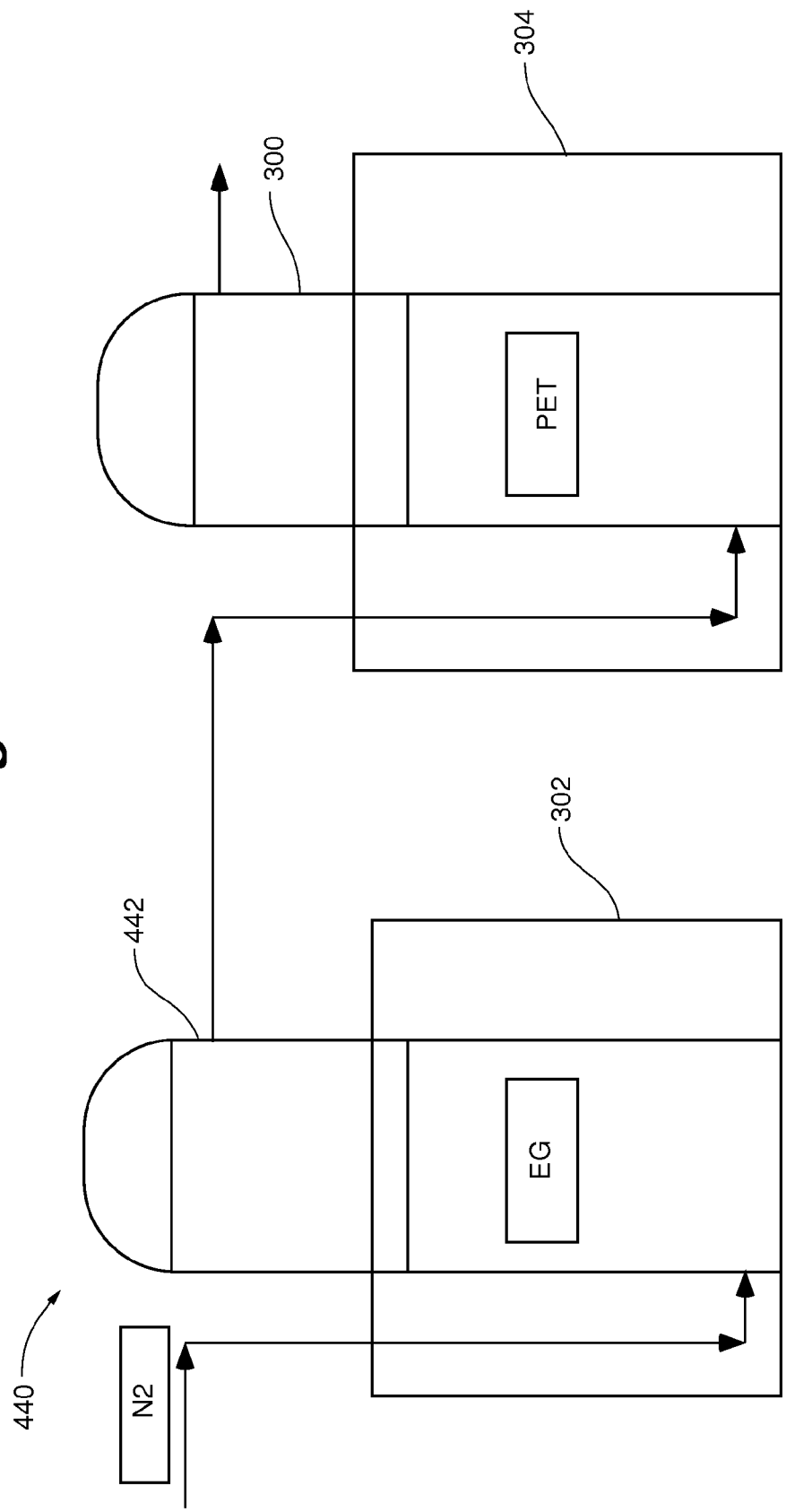
FIG. 2 provides a schematic view of a first embodiment of a reactant vaporizer system.

A simplified version of a first embodiment of a reactant vaporizer system 440 is shown in FIG. 2. In this embodiment, hot carrier gas (e.g., nitrogen or carbon dioxide) is introduced into a tank 442 containing heated liquid reactant (e.g., EG). The hot carrier gas vaporizes the liquid reactant and the combined control medium is introduced into a separate reactor tank 300 containing polymer (e.g., rPET) for the solid state reaction and decontamination. As shown, tank 442 may be kept at a desired temperature by partial immersion in water bath 302. In some embodiments, reactor 300 is kept at a desired temperature by partial immersion in an oil bath 304.

Figure 3:
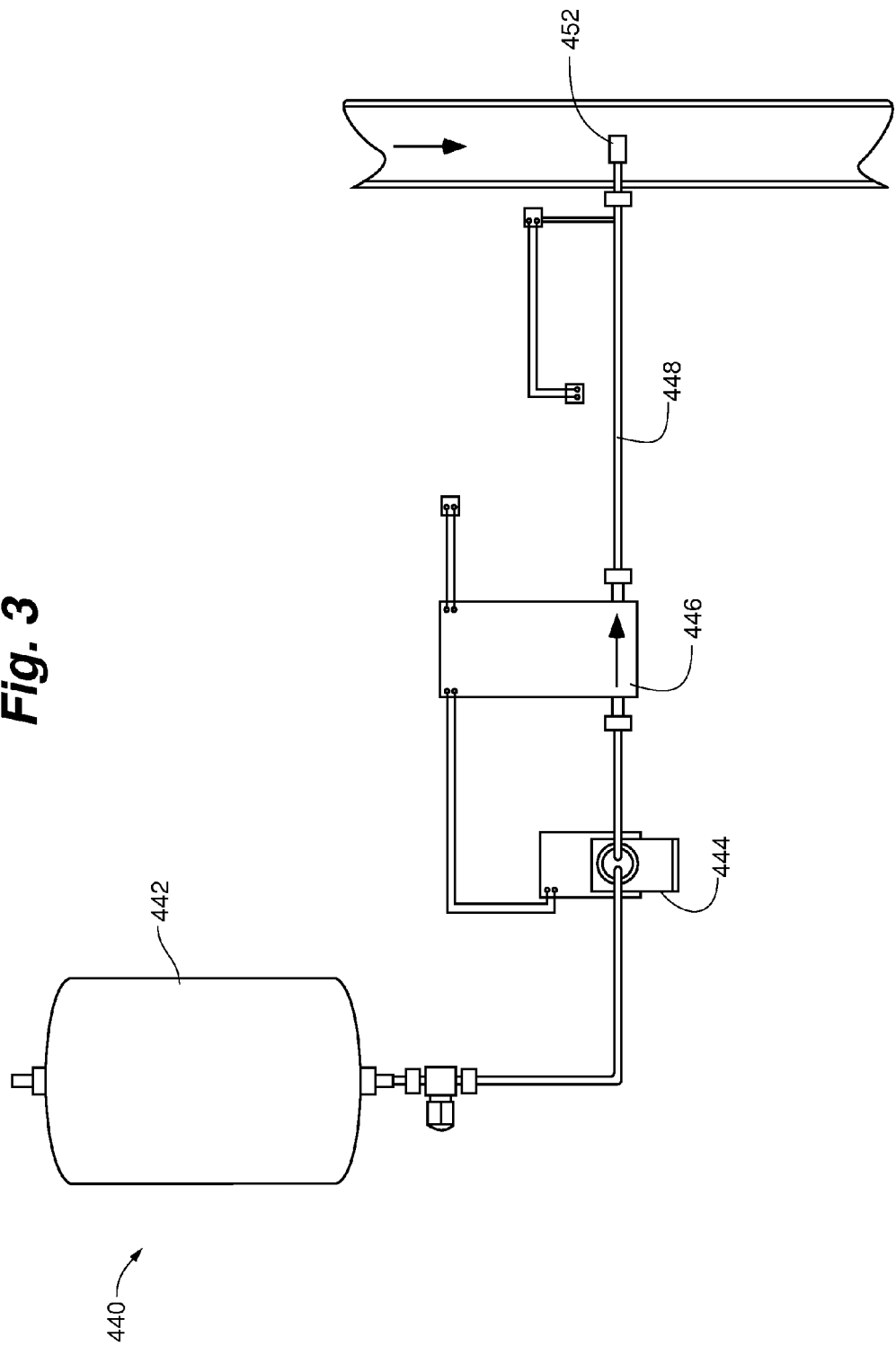
FIG. 3 provides a schematic view of a second embodiment of a reactant vaporizer system.

Another embodiment of a reactant vaporizer system 440 is shown in FIG. 3. This embodiment allows for greater control of the reactive vapor concentration in the carrier gas. In the embodiment of FIG. 3, liquid reactant (e.g., EG) is kept in a tank 442. The liquid is pumped by a pump 444 connected to a mass flow controller 446, which allows for precise control of the amount of reactive liquid distributed. An example of a suitable mass flow controller is a Cori-Flow Mass Flowmeter/Controller produced by Bronkhorst USA Inc., Bethleham Pa. Heat is applied to the pipe 448 carrying the liquid reactant to heat it to a temperature at which it can be vaporized in a hot carrier gas stream. The heated liquid reactant is then sprayed into an inert hot carrier gas stream via a liquid distributor 452 to vaporize the reactant in the gas stream and form the control medium, which is then introduced into the reactor 300.

Solid State Reaction Zone

In some embodiments, the preheated polymer is discharged from the preheater 200 into the solid state reactor 300. The reactor 300 is sometimes referred to as a hopper reactor herein. In some embodiments, the reactor 300 is essentially a void cylindrical vessel. In certain embodiments, the solids form a plug-flow moving bed in the reactor 300, with controlled residence time and temperature to optimize the final product intrinsic viscosity (IV). The solid state reaction zone, due to its ability to control the process variables, can process the feed material in any of four discrete zones of operation. The four zones are characterized by the following descriptions based on the optimized process conditions, such as residence time, processing temperature, and reactive vapor concentration within the control medium. Generally, residence time will be between about 2 hours and about 8 hrs, processing temperature will be between about 190° C. and about 220° C. (e.g., between about 200° C. and about 220° C.), and reactive vapor concentration within the control medium will be between about 0 and about 400,000 ppm. The four zones are:

1. Decreasing molecular weight (e.g., having a ΔIV of about −0.65 to about −0.40 dl/g), by the solid phase depolymerization reaction;

2. Holding constant molecular weight (e.g., having a ΔIV of about 0 dl/g), by balancing depolymerization and polymerization;

3. Decreasing the rate of molecular weight increase by retarding the polymerization rate (e.g., having a ΔIV/hr of about 0.01 to about 0.02 dl/g-hr) for a given reaction temperature; or 4. Increasing the molecular weight (e.g., having a ΔIV of about 0.2 to about 0.4 dl/g), by solid phase polymerization reactions.

In summary, for a given residence time and processing temperature, by controlling reactive vapor concentration in the gas stream the specific mode of operation of the solid state reaction zone can be controlled to operate in one of the four previously mentioned zones while in addition enabling the removal of volatile chemicals entrapped within the polymer to prepare the polymer for food and non-food contact applications. Further, in some embodiments, molecular weight may be increased without a decrease in the reaction rate. Embodiments of the invention permit the recovery of product having a number average molecular weight in the range of about 3,000 to about 115,000, and an intrinsic viscosity in the range of about 0.15 to about 1.30 dl/g.

When operating in any of the four zones noted above, in some embodiments heated control medium vapors (e.g., EG) blended with carrier gas (e.g., nitrogen or carbon dioxide) enters through the bottom of the hopper reactor forming a counter-current flow to the downward moving bed of polymer (PET). In some embodiments, control medium distribution nozzles are placed at the bottom of the reactor and are placed to evenly distribute the control medium over the entire cross-section of the hopper reactor. The reactive vapors in the control medium diffuse into the PET initiating depolymerization by the reactive vapor molecules absorbed in the solid polymer. Any byproducts of the reaction such as water and excess reactant are carried out to the gas purification system.

The bottom section of the hopper reactor, in some embodiments, allows for the uniform draw down of the bed material in plug-flow regime, and thereby promoting uniform reaction time and temperature. In such embodiments, the bottom portion of the reactor can be provided with a mechanical discharge 310. The mechanical discharge can include a rotating blade that spins slowly above the outlet of the reactor. Such a design promotes plug flow of the polymer as it moves through the reactor, thereby reducing the variance of residence times of polymer across cross-sections of the reactor. The mechanical discharge 310 controls the solids discharge rate as well as the bed level in the solid state reactor. For a given residence time and processing temperature, the operating zone is determined by the concentration of the reactive vapor in the carrier gas.

Figure 4:
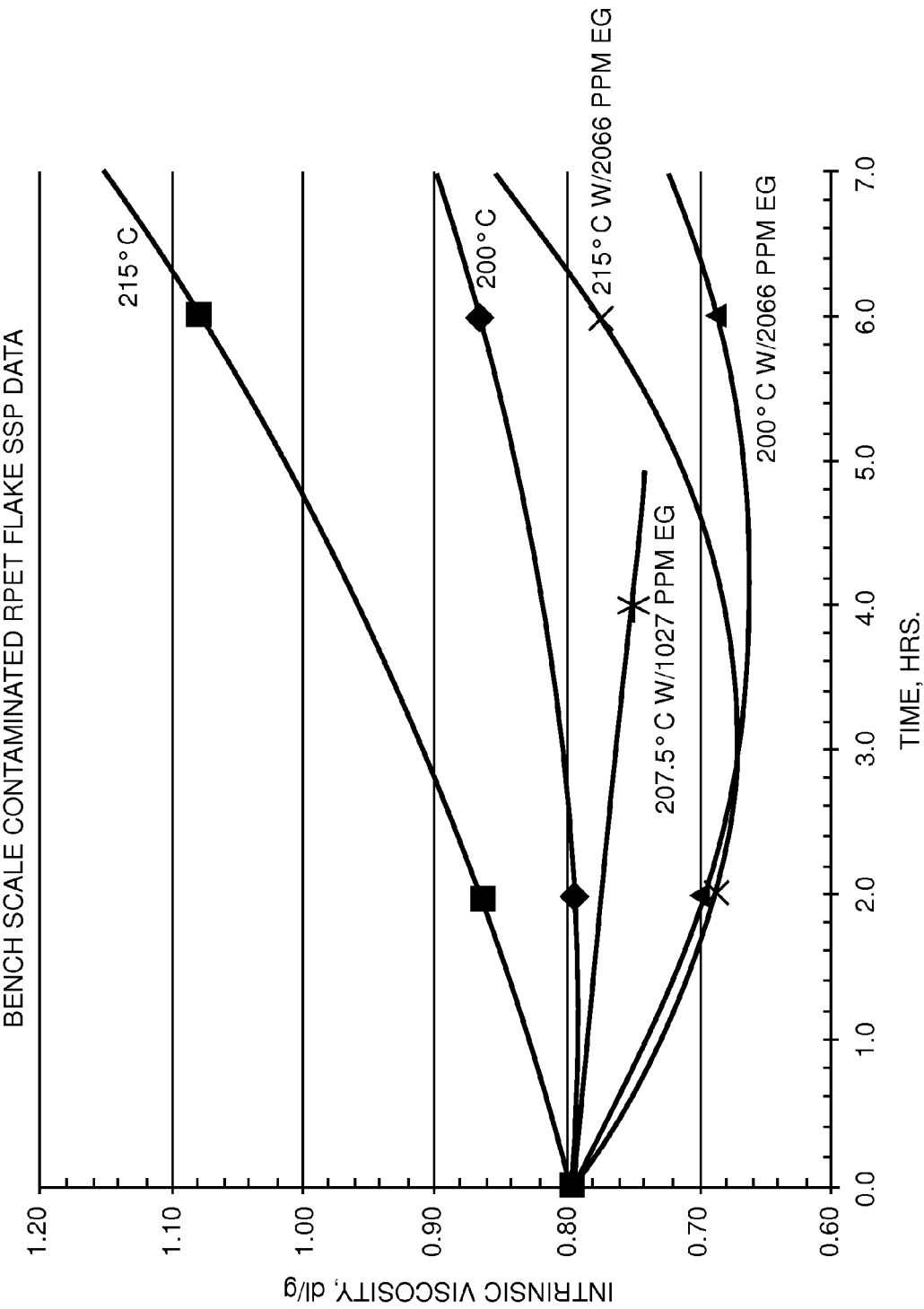
FIG. 4 provides a series of curves showing intrinsic viscosity's dependence on the presence of low vapor concentrations of ethylene glycol in the reaction vessel and the reaction vessel temperature for a given amount of time.
Figure 5:
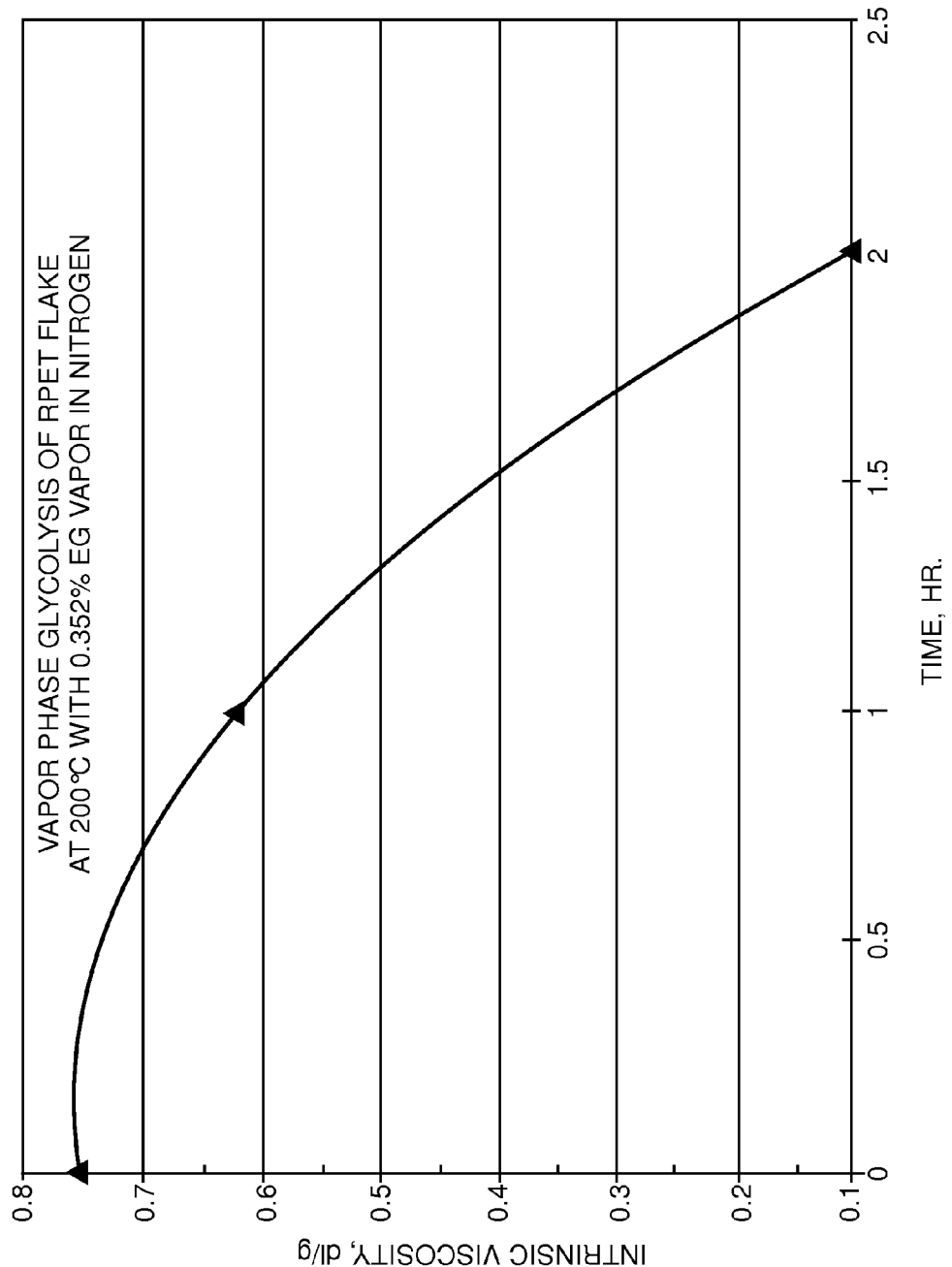
FIG. 5 provides a reaction time versus intrinsic viscosity curve for high vapor concentrations of ethylene glycol.

As shown in FIGS. 4-5, ethylene glycol (EG) in a gas stream affects the rate of solid state polymerization (SSP). As shown in the curves of FIG. 4, with increasing EG content in the gas stream, SSP reaction rates decrease at a given reaction temperature and reaction time.

Therefore, by controlling the reactive vapor concentration in the control medium, the specific mode of operation of the solid state reaction zone can be controlled to operate in one of the four previously mentioned zones while in addition removing chemicals entrapped within the polymer to prepare the polymer for food and non-food contact applications. Further, in some embodiments these chemicals are removed while simultaneously achieving a final IV of the product within the 0.72-0.82 dl/g IV range that is most typically used by beverage and water bottling companies. Further, methods in accordance with embodiments of the invention can simultaneously decontaminate the recycled polymers to reduce concentration levels to meet and even exceed FDA guidelines for food packaging. Organic contaminates removable by embodiments of the invention include volatile polar, volatile non-polar, non-volatile polar and non-volatile non-polar compounds. Examples of such compounds are toluene, benzophenone, lindane, chlorobenzene, phenyl cyclohexane, methyl salycilate, methyl stearate, chloroform, limonene and any combination thereof, as discussed further below. In some embodiments, the SSP and decontamination steps are done under atmospheric pressure.

In some embodiments the method decreases the concentration of toluene, which the FDA requires to be less than 4860 ppm, to less than 4860 ppm. In other embodiments, the concentration of toluene is decreased to less than 1,000 ppm (e.g., less than 500 ppm). In yet other embodiments, the concentration of toluene is decreased to less than 100 ppm (e.g., less than 50 ppm, and in some embodiments, to less than 10 ppm).

Embodiments of the method can also decrease the concentration of benzophenone, which the FDA requires to be less than 780 ppm, to less than 780 ppm. In some embodiments, the concentration of benzophenone is decreased to less than 500 ppm (e.g., less than 400 ppm). In other embodiments, the concentration of benzophenone is decreased to less than 100 ppm (e.g., less than 50 ppm, and in some embodiments, to less than 10 ppm).

In some embodiments the method decreases the concentration of lindane, which the FDA requires to be less than 49 ppm, to less than 49 ppm. In other embodiments, the concentration of lindane is decreased to less than 40 ppm (e.g., less than 30 ppm). In yet other embodiments, the concentration of lindane is decreased to less than 20 ppm (e.g., less than 10 ppm, and in some embodiments, to less than 5 ppm).

Further, in some embodiments the method decreases the concentration of chlorobenzene, which the FDA requires to be less than 750 ppm, to less than 750 ppm. In other embodiments, the concentration of chlorobenzene is decreased to less than 500 ppm (e.g., less than 300 ppm). In yet other embodiments, the concentration of chlorobenzene is decreased to less than 100 ppm (e.g., less than 50 ppm, and in some embodiments, to less than 10 ppm).

Embodiments of the method can also decrease the concentration of phenyl cyclohexane, which the FDA requires to be less than 1080 ppm, to less than 1080 ppm. In some embodiments, the concentration of phenyl cyclohexane is decreased to less than 500 ppm (e.g., less than 300 ppm). In other embodiments, the concentration of phenyl cyclohexane is decreased to less than 100 ppm (e.g., less than 50 ppm, and in some embodiments, to less than 10 ppm).

In some embodiments the method decreases the concentration of methyl salycilate, which the FDA requires to be less than 390 ppm, to less than 390 ppm. In other embodiments, the concentration of methyl salycilate is decreased to less than 300 ppm (e.g., less than 200 ppm). In yet other embodiments, the concentration of methyl salycilate is decreased to less than 100 ppm (e.g., less than 50 ppm, and in some embodiments, to less than 10 ppm).

As another example, some embodiments of the method decrease the concentration of methyl stearate, which the FDA requires to be less than 200 ppm, to less than 200 ppm. In some embodiments, the concentration of methyl stearate is decreased to less than 150 ppm (e.g., less than 100 ppm). In other embodiments, the concentration of methyl stearate is decreased to less than 50 ppm (e.g., less than 10 ppm, and in some embodiments, to less than 1 ppm).

In some embodiments the method decreases the concentration of chloroform to less than 5,000 ppm. In other embodiments, the concentration of chloroform is decreased to less than 1,000 ppm (e.g., less than 500 ppm). In yet other embodiments, the concentration of chloroform is decreased to less than 100 ppm (e.g., less than 10 ppm, and in some embodiments, to less than 1 ppm).

Accordingly, embodiments of the invention are useful for decontaminating recycled polymers, such as rPET, such that they may be used for food packaging.

Product Discharge

In some embodiments, the hot and dry solid state polymerized or depolymerized PET chips/flakes from the solid state reactor 300 are directly transferred via mechanical discharge 310 to hopper 610 and extruder 600 for processing into products such as food grade packaging.

Carrier Medium Purification System

Embodiments of the invention can also include a carrier medium purification system to purify and recycle both the reactive vapor and carrier gas to further reduce raw materials consumed by the process. In such embodiments, the gases from the reaction and preheating processes can be exhausted to the carrier medium purification system. Some embodiments of the purification system include a gas-to-gas economizer to recover process heat. A gas blower 410 can be used to pressurize the gas back to the desired system pressure, and a gas cooler/condenser 460 can be provided to recover residual reactive vapors. In some embodiments, the gas may be supplied to a molecular sieve dehumidifier 400. The moisture and any other volatile organic chemicals in the process gas are removed in the molecular sieve dehumidifier by adsorption prior to returning the clean carrier gas back to the hopper reactor 300. In some embodiments, the molecular sieve dehumidifier includes two adsorption towers A and B; one is in the adsorption mode while the other is in the regeneration mode. In other embodiments, the molecular sieve includes a honeycomb style rotating wheel.

EXAMPLES

The following examples are presented for illustrative purposes and are not intended to limit the scope of the claims that follow.

Example 1

In this example, virgin PET flakes were used in Run 1, shown in Table 1. In Run 2, the virgin PET flakes were contaminated with a cocktail containing chloroform, toluene, benzophenone and lindane in hexane. The PET flakes were stirred in the cocktail maintained at 42 deg C. for 15 days and then filtered and rinsed twice with distilled water. The surface moisture was removed by natural evaporation at room temperature. These contaminated PET flakes were labeled as Run 2 and used in a bench scale decontamination under a flow of hot nitrogen.

The process variables used in the decontamination and SSP process were temperature, treatment time, and EG vapor content in the nitrogen gas stream. The following two levels for each of these variables were chosen: 200° C. and 215° C. for the treatment temperature; 2 hours and 6 hours for the treatment time; and 0 ppm and 2066 ppm for the EG vapor content in the treatment gas. The samples obtained with these combinations of the process variables were labeled as Run 3 to Run 10. In Run 11 the contaminated PET flakes were treated at process variables which were at the mid-point of the above mentioned range. Curves from the data of Table 1 are provided in FIG. 4, and a reaction time versus intrinsic viscosity curve for a vapor phase glycolysis of rPET flak at 200° C. with 0.352% EG vapor in Nitrogen is provided in FIG. 5.

The rPET flake properties monitored after treatment were IV and residual content of chloroform, toluene, benzophenone and lindane. The results clearly show that higher temperatures and higher treatment times increase the flake IV and as well as the level of decontamination. The presence of EG vapor reduced the flake IV but enhanced the level of decontamination under identical time and temperature of treatment.

boxes, each weighing roughly 600 kg. The second was a mixture of many colors of flake containing no clear flake left over from a previous trial. This flake was contained in two drums each weighing about 40 kg. The third was all clear/white contaminated flake obtained from Fraunhofer Institute, Germany. Details of the feed flake are as follows:

1. 70% green and 30% clear mixed post-consumer PET bottle flake from SIGNODE for stabilizing process (approx. 1200 kg).
2. 100% clear virgin PET bottle flakes contaminated with model compounds per FDA requirements—Batch 2 (43 kg).
3. 100% mixed color virgin PET bottle flakes without clear from MERLIN Plastics to partition the clear flakes (80 kg).
4. Technical Grade Ethylene Glycol from EM Science Cat.#EX-0564-1 (3 liter bottle)

Three small drums of the contaminated flake were received and weighed a total of 54.3 kg (120 lbs.). These drums were dewatered in a Sweco screener equipped with a 20 mesh screen prior to testing. After screening the flake weighed 43 kg (95 lbs.). All flake types were fed through an Accurate feeder with a 2" housing and 1" screw.

The process set up for this example is essentially as shown in FIG. 1. The following equipment was used: Solidaire Model SJS 8-4, Hopper Dryer Model HDJS 17-8.3, Mechanical Discharge Model MD-17, Variable Frequency Drive, MasterFlex Pump Drive w/FMI "Q" Pump piston pump attachment, 4 kW Chromalox Gas Heater w/2-20 SCFM Rotameter, and Accurate Volumetric Feeder w/2" housing

TABLE 1

Decontamination and SSP Results - Bench Scale Trial

| Run | Factor 1 A: Temp. deg. C | Factor 2 B: Time hr. | Factor 3 C: EG ppm | Response 1 I.V. dl/g | Response 2 Chloroform ppm | Response 3 Toluene ppm | Response 4 Benzophenone ppm | Response 5 Lindane ppm |
|---|---|---|---|---|---|---|---|---|
| 1 | 25 | N/A | N/A | 0.7948 | 0 | 0 | 0 | 0 |
| 2 | 25 | N/A | N/A | | 5532 ± 1.3 | 1361 ± 3.6 | 1238 ± 5.3 | 1333 ± 146.2 |
| 3 | 200 | 2 | 0 | 0.7951 | 7.6 ± 0.16 | 1.8 ± .04 | 8.6 ± 0.19 | 13.2 ± 0.5 |
| 4 | 200 | 6 | 0 | 0.8643 | 0.7 ± 0.01 | <0.14 | 2.3 ± 0.07 | 5.4 ± 0.7 |
| 5 | 215 | 2 | 0 | 0.8639 | 0.7 ± 0.01 | 0.5 ± 0.04 | 1.5 ± 0.03 | 4.8 ± 0.1 |
| 6 | 215 | 6 | 0 | 1.0849 | <0.06 | <0.14 | 0.6 ± 0.04 | 0.9 ± 0.1 |
| 7 | 200 | 2 | 2066 | 0.6973 | 0.7 ± 0.04 | <0.21 | 3.5 ± 0.09 | 12.3 ± 0.4 |
| 8 | 200 | 6 | 2066 | 0.6877 | <0.03 | <0.21 | <0.10 | 3.7 ± 0.3 |
| 9 | 215 | 2 | 2066 | 0.6872 | 0.3 ± 0.01 | <0.21 | 0.24 ± 0.09 | 4.3 ± 0.3 |
| 10 | 215 | 6 | 2066 | 0.7773 | <0.03 | <0.21 | <0.10 | <1.8 |
| 11 | 207.5 | 4 | 1027 | 0.7505 | <0.03 | <0.21 | <0.10 | 2.1 ± 0.1 |

Example 2

In this example a single 19 hour continuous pilot scale run was made at a solids feed rate of 45 kg/hr. Non-contaminated post-consumer green flake was passed through the system for 14 hours to achieve steady state. Roughly 43 kg of contaminated clear flake was then introduced to the system, followed by more non-contaminated post-consumer green flake. Samples of the decontaminated clear flakes were taken at both the Solidaire discharge and the Hopper Dryer discharge at 10 min. intervals. The flake was held in the Hopper Dryer at a temperature of 210° C. for a minimum of 4 hours with a counter current flow of hot nitrogen containing 500 ppm$_w$ of ethylene glycol vapor resulting in an IV increase from 0.7813 dl/g to 0.8265 dl/g at an SSP rate of 0.0113 dl/g. The SSP reaction rate decreased by 5× due to the presence of the ethylene glycol vapor.

Three different types of feed flake were used for this example. The first was mostly green flake with some clear flake mixed in. This green flake was contained in two Gaylord and 1" solid flight screw. The Masterflex pump system was used to meter ethylene glycol into the gas inlet port of the mechanical discharge. A diffuser nozzle was used to aid in evaporation of the ethylene glycol. The mechanical discharge was operated through a variable frequency drive to achieve the speeds necessary for such low flow rates. A system of alternating knife gates was used to prevent gas from leaking out the bottom of the column. The preheating and SSP conditions for this example are provided in Table 2.

TABLE 2

Conditions for Example 2

Preheating Conditions:

| | |
|---|---|
| Chip Feed Rate: | 45.5 kg/hr |
| Preheater Type: | SJS 8-4 |
| Hot Oil Supply/Return Temp: | 221° C/219° C |
| Product Temp: | 210° C |

TABLE 2-continued

Conditions for Example 2

SSP and Decontamination Conditions:

| | |
|---|---|
| Hopper Reactor: | Model HRJS 17-8.3 w/MDS-17 |
| Jacket Hot Oil Inlet Temperature: | 210° C |
| Bed Temperature: | 210° C |
| Residence Time: | 4 hr |
| Gas Flow Rate/Temp: | 16.50 scfm/215° C (G/S = 0.71, V = 17 afm) |
| Discharge Rate: | 45.5 kg/hr |
| EG Feed Rate: | 16.5 ml/hr (500 ppmw in nitrogen) |

Material was metered into the Solidaire at a rate of 45 kg/hr. The flake discharged from the Solidaire directly into the hopper reactor. Material was allowed to fill the hopper reactor to a level 45 cm below the sight glass located on the top of the column. Once the level was achieved the mechanical discharge was turned on and calibrated to discharge material at 45 kg/hr. At this rate the material experienced a residence time of 4 hrs. Product was collected in metal pails and stored in fiber drums.

Testing began with the green flake passing through the Solidaire and the hopper reactor for about 14 hrs, allowing the system to achieve steady state. Next, 40 kg. of colored flake was then introduced to indicate the approach of the clear contaminated flake to the mechanical discharge. A total of 43 kg of contaminated clear flake was then added, followed by another 40 kg. of the colored flake. Additional green flake was then introduced until the decontaminated clear flake was completely discharged.

During the feeding of the contaminated clear flake into the system, samples were collected from the Solidaire discharge every ten minutes starting from the first signs of clear material until the first signs of colored material. This same process was then performed 4 hrs later at the hopper reactor discharge. The time-temperature history of the contaminated clear flake in the hopper reactor was recorded at 1 min. intervals with a multi-position axial temperature probe.

100 gm each of the feed from the top and the soaked bottom of the drum from Batch 2 of the clear flakes were collected. 100 gms each of the preheater product and hopper reactor product were collected every 10 min. for the clear flakes including transition.

Table 3 shows the results of the internal viscosity (IV) analysis, where time=0 when the first signs of clear flake were observed at Solidaire discharge, SA means SolidAire, and HR means hopper reactor.

TABLE 3

Intrinsic Viscosity Test Results

| Sample ID | Time (min) | Sampling Location | IV |
|---|---|---|---|
| 1 | | Non-contaminated Feed | 0.7948 |
| 14 | 20 | SA Discharge | 0.7745 |
| 15 | 30 | SA Discharge | 0.8109 |
| 16 | 40 | SA Discharge | 0.7752 |
| 17 | 50 | SA Discharge | 0.7769 |
| 18 | 60 | SA Discharge | 0.7690 |
| 19 | 270 | HR Discharge | 0.8333 |
| 20 | 280 | HR Discharge | 0.8289 |
| 21 | 290 | HR Discharge | 0.8419 |
| 22 | 300 | HR Discharge | 0.8352 |
| 23 | 310 | HR Discharge | 0.8275 |

Table 4 shows the results. As can be seen from comparing samples 19-23 to samples 13-18, introduction of the ethylene glycol was effective in reducing the contamination for chloroform, toluene, benzophenone, lindane, chlorobenzene, phenyl cyclohexane, and methyl stearate. Further, the process was effective at lowering the concentration of these contaminates well below FDA guidelines.

TABLE 4

Decontamination Results

| Sample # | Temp. deg. | Time hr. | EG Content ppm | Chloroform ppm | Toluene ppm | Benzophenone ppm | Lindane ppm | Chlorobenzene ppm | Phenyl Cyclohexane ppm | Methyl Salycilate ppm | Methyl Stearate ppm |
|---|---|---|---|---|---|---|---|---|---|---|---|
| 1 | 25 | N/A | N/A | 0 | 0 | 0 | 0 | 0 | 0 | 0 | 0 |
| FDA Standard | | N/A | N/A | | 4860 | 780 | 49 | 750 | 1080 | 390 | 200 |
| 2 | 25 | N/A | N/A | 5532 | 1361 | 1238 | 13332 | | | | |
| 12 | 25 | N/A | N/A | 847.4 | 615.3 | 481.4 | 282.4 | 1059.9 | 274.1 | 458.7 | 369.6 |
| 12A | 25 | N/A | N/A | 944.4 | 777.8 | 446.0 | 245.3 | 1259.9 | 230.0 | 493.1 | 296.1 |
| 13 | 210 | 0.1 | 0 | 119.3 | 44.1 | 135.6 | 79.4 | 122.5 | 31.2 | 80.2 | 43.7 |
| 14 | 210 | 0.1 | 0 | 175.7 | 49.4 | 88.6 | 50.7 | 86.0 | 6.3 | 45.7 | 22.6 |
| 15 | 210 | 0.1 | 0 | 130.9 | 74.7 | 307.7 | 143.4 | 150.5 | 38. | 114.4 | 143.4 |
| 16 | 210 | 0.1 | 0 | 126.7 | 79.5 | 604.2 | 403.4 | 172.2 | 62.2 | 166.7 | 290.8 |
| 17 | 210 | 0.1 | 0 | 173.8 | 65.6 | 295.5 | 178.3 | 130.2 | 27.3 | 97.3 | 128.9 |
| 18 | 210 | 0.1 | 0 | 293 | 99.7 | 197.2 | 107.5 | 171.1 | 15.4 | 91.4 | 67.2 |
| 19 | 210 | 4.0 | 500 | 0.3 | <0.08 | 0.5 | 2.5 | 0.1 | 0.1 | <0.06 | 0.2 |
| 20 | 210 | 4.0 | 500 | 0.3 | <0.08 | 0.4 | 2.2 | <0.04 | 0.1 | <0.06 | 0.2 |
| 21 | 210 | 4.0 | 500 | 0.3 | <0.08 | 1.5 | 6.3 | 0.1 | 0.2 | <0.06 | 0.6 |
| 22 | 210 | 4.0 | 500 | 0.2 | <0.08 | 0.9 | 6.4 | <0.04 | <0.02 | <0.06 | 0.4 |
| 23 | 210 | 4.0 | 500 | 0.6 | <0.08 | 1.4 | 5.0 | 0.7 | <0.02 | <0.06 | 0.3 |

What is claimed is:

1. A process for processing post-consumer polyester polymers comprising the steps of:
   a) conveying post-consumer polymer feed material to a reaction vessel;
   b) heating the polymer feed material to a temperature sufficient to initiate and sustain reaction in a solid state;
   c) contacting the heated polymer with a control medium comprising a carrier gas and a reactive vapor;
   d) performing a solid state reaction (SSR) between the polymer and control medium, to provide a product;
   e) discharging the product,
   wherein the reactive vapor comprises ethylene glycol at a concentration of about 10 and 3,000 ppm in the control medium.

2. A process according to claim 1, wherein the polymer comprises PET.

3. A process according to claim 1, wherein the process permits the recovery of product having a number average molecular weight in the range of 3000 to 115,000 and an intrinsic viscosity in the range of 0.15 to 1.30 dl/g.

4. A process according to claim 3, wherein the product is discharged to an extruder to produce a food grade product.

5. A process according to claim 1, wherein a residence time for the reaction is about 2 to about 8 hours.

6. A process according to claim 1, wherein a temperature of the polymer during the reaction is about 190 to about 220° C.

7. A process according to claim 1, wherein the discharged product of step e) has contaminant levels below 0.22 ppm.

8. A process according to claim 1, wherein the discharged product of step e) has an intrinsic viscosity between 0.78 and 0.82 dl/g.

9. A process according to claim 1, wherein the carrier gas is nitrogen.

10. A process according to claim 1, wherein the carrier gas is carbon dioxide.

11. A process according to claim 1, further comprising removing contaminants from the polymer with the control medium.

12. A process according to claim 11, further including recovering the control medium, separating the contaminants from the control medium, and reintroducing the control medium to the polymer.

13. A process for processing post-consumer polyester polymers comprising the steps of:
   a) conveying post-consumer polymer feed material to a reaction vessel;
   b) heating the polymer feed material to a temperature sufficient to initiate and sustain reaction in a solid state;
   c) contacting the heated polymer with a control medium comprising a carrier gas and a reactive vapor;
   d) performing a solid state reaction (SSR) between the polymer and control medium, to provide a product;
   e) simultaneously with step (d), reducing the level of contaminants within the polymer with the control medium; and
   f) discharging the product,
   wherein the reactive vapor comprises ethylene glycol at a concentration of about 10 and 3,000 ppm in the control medium.

14. A process according to claim 13, wherein the contaminants are selected from the group consisting of organic volatile polar, organic volatile non-polar, organic non-volatile polar, organic non-volatile polar contaminants, and any combination thereof.

15. A process according to claim 13, wherein the contaminants are selected from the group consisting of toluene, benzophenone, lindane, chlorobenzene, phenyl cyclohexane, methyl salicylate, methyl stearate, chloroform, and any combination thereof.

16. A process according to claim 13, wherein steps (d) and (e) are done under atmospheric pressure.

17. A process according to claim 1, wherein the carrier gas comprises nitrogen, the rate of polymer molecular weight increase is decreased in the solid state reaction, and the discharged product of step e) has contaminant levels below 0.22 ppm.

18. A process according to claim 13, wherein the discharged product of step e) has contaminant levels below 0.22 ppm.

19. A process for processing post-consumer polyester polymers comprising the steps of:
   a) conveying post-consumer polymer feed material to a reaction vessel;
   b) heating the polymer feed material to a temperature sufficient to initiate and sustain reaction in a solid state;
   c) contacting the heated polymer with a control medium comprising a carrier gas and a reactive vapor;
   d) performing a solid state reaction (SSR) between the polymer and control medium, to provide a product;
   e) discharging the product,
   wherein the reactive vapor comprises ethylene glycol at a concentration of about 10 and 3,000 ppm in the control medium, a residence time for the reaction is about 2 to about 8 hours, a temperature of the polymer during the reaction is about 190 to about 220 C, and the process permits the recovery of product having a number average molecular weight in the range of 3000 to 115,000 and an intrinsic viscosity in the range of 0.15 to 1.30 dl/g.

20. A process according to claim 19 wherein the discharged product of step e) has contaminant levels below 0.22 ppm.

21. A process according to claim 20, wherein the contaminants are selected from the group consisting of toluene, benzophenone, lindane, chlorobenzene, phenyl cyclohexane, methyl salicylate, methyl stearate, chloroform, and any combination thereof.

22. A process according to claim 19 wherein the product is discharged to an extruder to produce a food grade product.

23. A process according to claim 19 wherein the rate of polymer molecular weight increase is decreased in the solid state reaction.

24. A process according to claim 19 wherein the rate of polymer molecular weight increase is decreased in the solid state reaction, the discharged product of step e) has contaminant levels below 0.22 ppm, the product is discharged to an extruder to produce a food grade product.

* * * * *